No. 620,172. Patented Feb. 28, 1899.
G. PHILIPPART.
SECONDARY BATTERY.
(Application filed Mar. 22, 1898.)
(Model.)
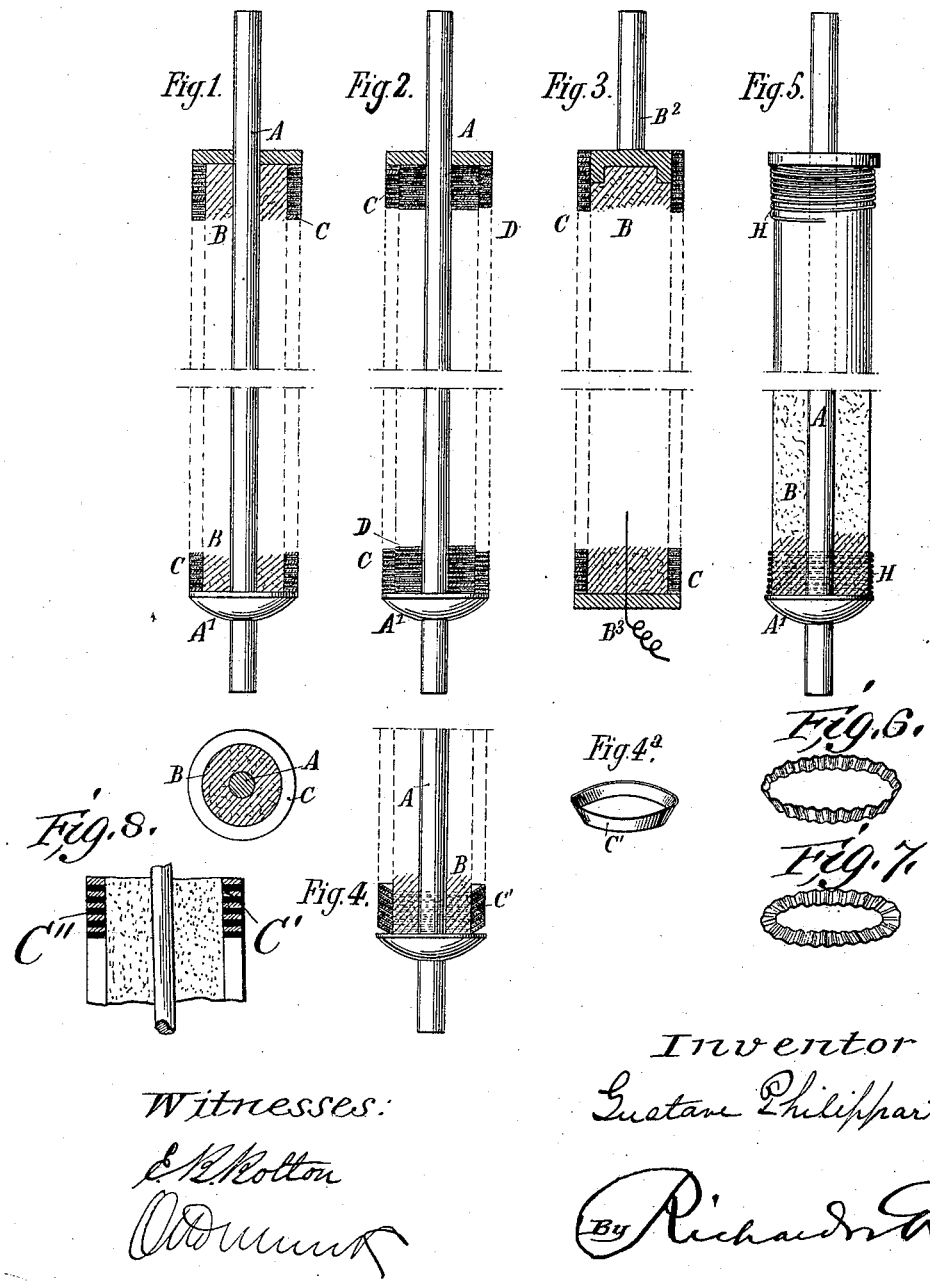
Witnesses:
Inventor
Gustave Philippart
By Richards
his Attorneys.

UNITED STATES PATENT OFFICE.

GUSTAVE PHILIPPART, OF PARIS, FRANCE.

SECONDARY BATTERY.

SPECIFICATION forming part of Letters Patent No. 620,172, dated February 28, 1899.

Application filed March 22, 1898. Serial No. 674,822. (Model.)

*To all whom it may concern:*

Be it known that I, GUSTAVE PHILIPPART, a subject of the King of Belgium, residing at Paris, France, have invented certain new and useful Improvements in Secondary Batteries, of which the following is a specification.

The invention has been patented in France, No. 271,392, dated October 16, 1897, and in England, No. 1,194, dated January 15, 1898.

My invention relates to an improved method of constructing the electrodes of electric accumulators which, while insuring a better maintenance of the active mass, may serve to facilitate or develop the electrolytic actions of the secondary battery.

The invention consists, essentially, in arranging around the active or porous substance a sort of sheath or flexible continuous casing—that is to say, a non-rigid one—presenting as a whole a certain elasticity. In general this casing or sheath will be formed of a large number of washers simply placed one upon the other, leaving between them an equivalent number of interstices, between which the liquid may easily pass in order to come in contact with the active mass. The casing which I employ forms, so to speak, a continuous protective sleeve for the solid active substance, while presenting numerous points of passage or interstices for the liquid. This sleeve has the advantage of being brought into intimate contact with the mass and of thus insuring the maintenance in a perfect manner. The washers, which may be of various natures, as hereinafter set forth, always allow an electrolytic action to be freely exercised through their interstices and enable in certain cases the metallic surface of the electrode to be considerably increased.

In the accompanying drawings, which are on an enlarged scale, the general arrangement of an electrode of an accumulator arranged on my improved system is shown.

In Figure 1, for instance, A is a conducting-support of lead, antimonious lead, aluminium, or the like. B is the porous substance or active mass, (salts and oxids of lead,) which rests on an enlarged or widened part A' of the support. C indicates the superposed washers, forming a casing or porous vessel around the active mass. It is of course evident that the support, the column of active substance, and the washers may have transversely any suitable form, whether rounded or angular, and that the washers may be flat or corrugated, Figs. 6 and 7, or be beveled or conical, as shown in Figs. 4 and 4$^a$, C', Fig. 4$^a$, being one of these washers seen in perspective. Fig. 6 is a perspective view of a washer of the form shown in Fig. 4$^a$, but corrugated. Fig. 7 is a view of a flat washer corrugated. Fig. 8 shows a sectional view of a modification in which conducting and non-conducting washers are used in combination.

The thickness of the washers may vary within wide limits—for instance, from one one-hundredth of a millimeter to three millimeters. They may also be ribbed or slightly corrugated in order to allow passages for the gas by their simple superposition. In any case, owing to their being simply placed one on the other, they form a porous vessel intended to prevent the disintegration of the active substance B. These washers as regards their constitution may be of any suitable insulating material—such as celluloid, glass, porcelain, pipe-clay, porous clay, ebonite, fiber, caoutchouc carbon, or the like, in which case they only form the porous vessel desired—or they may equally well be made of a conducting substance, such as lead, antimonious lead, aluminium, or the like. In the latter case the porous vessel will have in addition the property of imparting to the battery an extraordinarily large metallic surface, which in certain cases is of great importance.

Conducting and non-conducting washers may also be used in combination or intermixed—that is to say, that it is possible to place alternately one on the other non-conducting and conducting washers, either separately or in groups and in a variable order, according to the work which is to be attained. One arrangement is shown in Fig. 8, C' being the conducting and C'' the non-conducting washers. In the case of conducting-washers it may be convenient to cause them to alternate with washers of a substance attacked by acids in order to form recesses, which after the first formation may be filled or otherwise by the active substance.

In the modification shown in Fig. 2 A is the conducting-support, and D the metallic washers, the interstices of which are filled or otherwise with active substances, such as salts and oxids of lead. C represents washers of insulating material, forming the porous vessel.

Fig. 3 shows another modification in which the "metallic support," properly so called, is dispensed with or reduced to its simplest form. B is a cylinder of active substance. $B^2$ is the outer current connection, made of suitable metal. C are the washers or series of insulated or metallic washers. The current connection may also be effected by a simple wire $B^3$, placed in the center of the cylinder.

Batteries thus formed may be considered as electrodes and those of the same name may be connected with one another in the most favorable manner horizontally or vertically in order to form an accumulator. The electrodes may also be connected by brazing, soldering, or the like in variable number in order to form, for instance, plates.

I may also form the porous and protective sleeve by a spiral of suitable section, such as is shown in Fig. 5, of an insulating or conducting material. This spiral, which is wound around the active substance, forms a continuous protective sleeve around the same, while leaving between its spirals sufficient interstices for the passage of the liquid. The electrolytic action is thus always permitted to come into action, while the active substance is protected against any disintegration.

By using the superimposed washers the wall formed thereby for holding the active material is practically solid so far as its power to prevent escape or falling out of the active material is concerned, and yet at the same time minute pores or capillary crevices are left in the wall, through which the electrolyte passes to the active material. The washers are in contact with each other.

I declare that what I claim is—

1. An electrode comprising active material and surrounding washers superimposed and in contact with each other forming a wall with minute pores or crevices between the washers through which the electrolyte may pass, said washers preventing the escape of the active material, substantially as described.

2. An electrode comprising a conductor active material and surrounding sleeve composed of superposed washers of ribbed or corrugated material, substantially as described.

3. An electrode comprising a conductor active material and surrounding sleeve composed of superposed washers of conical form, substantially as described.

4. An electrode comprising a conductor active material and a series of superposed washers surrounding the same and alternately of conducting and non-conducting material, substantially as described.

In witness whereof I have hereunto set my hand in presence of two witnesses.

GUSTAVE PHILIPPART.

Witnesses:
ANDRÉ MOSTICKE,
EDWARD P. MACLEAN.